Jan. 27, 1970 I. S. ROBERTS 3,491,962

HIGH SPEED WINDER

Filed Dec. 16, 1965 6 Sheets-Sheet 1

INVENTOR:
INGHAM S. ROBERTS
BY Howson & Howson
ATTYS.

HIGH SPEED WINDER

Filed Dec. 16, 1965 6 Sheets-Sheet 2

INVENTOR:
INGHAM S. ROBERTS
BY Howson & Howson
ATTYS.

HIGH SPEED WINDER

Filed Dec. 16, 1965 6 Sheets-Sheet 3

INVENTOR:
INGHAM S. ROBERTS
BY Howson & Howson
ATTYS.

HIGH SPEED WINDER

Filed Dec. 16, 1965 6 Sheets-Sheet 4

INVENTOR:
INGHAM S. ROBERTS
BY Howson & Howson
ATTYS.

HIGH SPEED WINDER

Filed Dec. 16, 1965 6 Sheets-Sheet 5

INVENTOR:
INGHAM S. ROBERTS
BY Howson & Howson
ATTYS.

HIGH SPEED WINDER

Filed Dec. 16, 1965 6 Sheets-Sheet 6

INVENTOR:
INGHAM S. ROBERTS
BY Howson & Howson
ATTYS.

United States Patent Office 3,491,962

Patented Jan. 27, 1970

3,491,962

HIGH SPEED WINDER

Ingham S. Roberts, 412 Harrison St., Ridley Park, Pa. 19078

Filed Dec. 16, 1965, Ser. No. 514,258

Int. Cl. B65h 54/28

U.S. Cl. 242—43 38 Claims

ABSTRACT OF THE DISCLOSURE

For use in yarn winding apparatus having takeup means for forming yarn into a package, a traverse assembly operable to guide the yarn as it is being wound to form the package including means for supporting the yarn for longitudinal and reciprocal movement in a traverse plane and at least two pairs of guide members adapted for movement in opposite directions in close juxtaposition to reciprocate the yarn back and forth in the traverse plane. Each of the guide members is arranged to pass through the traverse plane in an outward direction to engage the yarn adjacent one end of the traverse and to pass through the traverse plane in an inward direction adjacent the opposite end of the traverse to release the yarn. The guide members are selectively positioned relative to one another so that the yarn is engaged by one guide when released by the other guide at transfer points adjacent opposite ends of the traverse. An inner guide bar is positioned parallel to the surface of the package and is disposed between the surface of the package and the paths of movement of the guide members and in close juxtaposition to both. The guide member is adapted to be maintained in a predetermined position relative to the surface of the package during build up whereby it is possible to build a package characterized by good form at relatively high speeds.

This invention relates to improvements in yarn winding apparatus. More particularly, the present invention relates to a yarn winding apparatus characterized by novel features of construction and arrangement including a novel traversing mechanism for guiding the yarn as it is wound onto a package form, which apparatus is capable of winding yarn at higher speeds than are attainable with the yarn winders which are now available.

In conjunction with the production, processing and shipping of natural and synthetic yarns and in subsequent textile manufacturing processes, it is necessary to make packages of the yarn for purposes of collection, transfer and storage or to put it into a suitable supply package form. For package weights of between 4 and 30 pounds, the preferred package is usually a cone or tube wound on a central form without end discs by successive helical wrappings. At the present there are various methods of forming packages of this kind. For example, in the apparatus for winding synthetic filament yarn, the apparatus usually includes a driven spindle upon which the package is mounted, a cam which imparts a reciprocating motion to a guide which lays the yarn on the package and a train of gears commonly referred to as "gainer gears" interconnecting and establishing a definite speed ratio between the spindle and cam. This method of winding yarn on this type of apparatus is generally referred to as "precise winding" because the yarn of each layer is always a definite distance ahead of or behind the yarn of the preceding layer as established by the gainer gear ratio.

These prior winding apparatus, however, have certain disadvantages or drawbacks which the present invention is designed to overcome. The principal ones from the standpoint of high speed winding are that the rate at which the yarn is wound onto the package is limited by the vibration, stresses and power consumption attendant to the reciprocating motion of the guide, and that this rate is insufficient to permit the use of these winders for some yarn spinning processes. Furthermore, in these apparatus, the yarn is laid on the package by a button guide which presses against the package or by the combination of a roller bail which presses against the package and a guide which is somewhat removed therefrom. At high yarn speeds, direct contact with the button guide damages the yarn and small roller bails cannot be used because of excessively high rotational speeds, for example about 36,000 r.p.m. for a 1¼" diameter roller bail at a yarn speed of 4,000 yards per minute. It has been found that as a practical matter it is difficult to design a guide for use with a large diameter roller bail which is properly placed to form sharp helix reversal bends and which is also strong and light enough to withstand rapid reciprocating motion.

In a precise yarn winder having constant spindle speed, the yarn takeup speed increases with the package diameter. Accordingly this type of machine is relatively uneconomical for rewinding operations where the yarn speed is limited by the speed with which it can be drawn from the supply package. Since the spindle speed must be set to provide the optimum yarn speed with a full package, it is therefore uneconomically slow during the early stages of package formation.

In accordance with the present invention, there is provided a precise yarn winder which embodies no reciprocating parts and which can be used with much higher yarn speed than is possible with the commercially available yarn winders which are discussed above. In conjunction with the speed and tension controller which is described in Roberts Patent No. 3,228,617, it can be used as a direct takeup from machines producing synthetic yarn or other filamentary material at a high rate of speed, or by controlling the spindle speed by the package size, it can be used as an economical general-purpose winder having approximately constant yarn takeup speed. As an important part of the yarn winder of the present invention there is provided a system of countermoving traversing guides mounted closely adjacent the periphery of the package which are in the form of fingers adapted to move the yarn in the traverse plane to build the package. During the period in which the yarn is reciprocated across the traverse plane by the guide fingers, the guide fingers move generally in a straight line path and adjacent the crossover or transfer points at the ends of the traverse, the guide fingers move in a slightly arcuate path. By this arrangement, there is provided a transverse acceleration of the yarn at the ends of the traverse countering a tendency of the yarn to "dwell" and thereby promoting the formation of sharp helix reversal angles and a package characterized by a good form. This arrangement thus lessens the tendency of the yarn to form "stitches."

Another feature of the yarn winding apparatus of the present invention is the provision of means for effecting positive movement of the axis of the roller bail or of the guide bar and thereby for maintaining a predetermined and generally close relationship between the guide bar and the package surface during formation of the package thereby facilitating operation of the winder at higher speeds than are attainable with the yarn winders which are now available. By precisely controlling the relationship between the guide bar and surface of the package during build-up, accurately formed helices of yarn with sharp helix reversal angles are laid on the package during formation thereof. In a preferred arrangement, the space between the bar and the package is progressively increased at a very small rate during the winding operation since this progressively decreases the package length and improves its end formation.

In addition to the capital economies associated with the high yarn speeds, the winder of the present invention is comparatively inexpensive to build, since it generally employs molded rather than machined parts and is inexpensive to maintain since there are no reciprocating parts. Also, in accordance with the yarn winder of the present invention the diameter and length of the package can be made very large by present standards without greatly increasing construction costs and large packages reduce operational costs. The winder of the present invention occupies comparatively little floor space thereby resulting in another obvious economy in plant facility.

These and other objects of the present invention and the various features and details of the operation and construction thereof are hereinafter more fully set forth with reference to the accompanying drawings, wherein.

Figure 2:
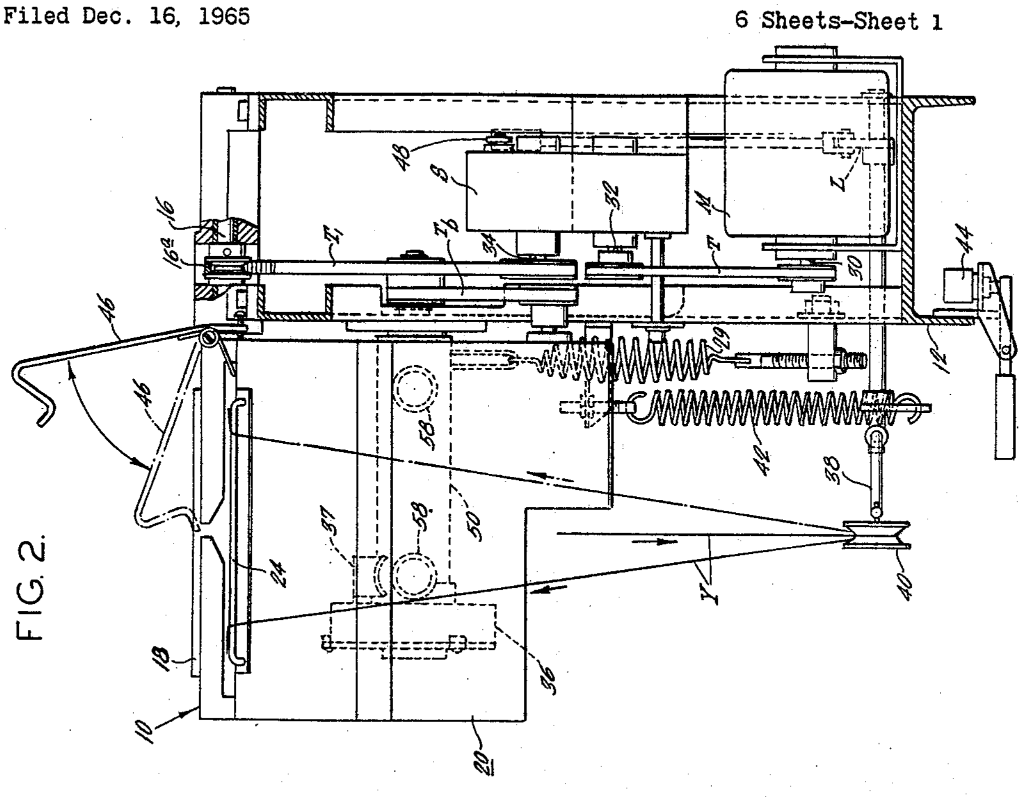
FIG. 2 is a side view of the yarn winder shown in FIG. 1.
Figures 1, 4:
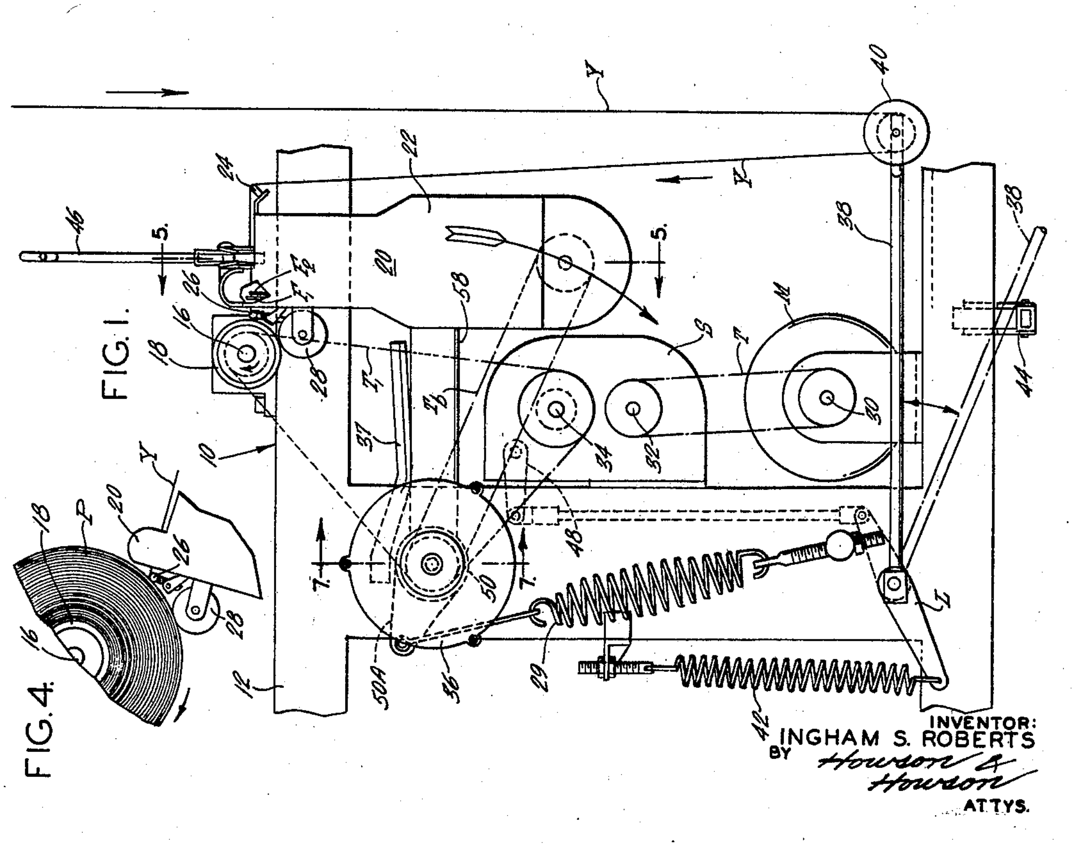
FIG. 1 is a front elevational view of a yarn winder in accordance with the present invention.
FIG. 4 is an enlarged fragmentary front elevational view of the package, roller bail and traverse guide bar assembly.
Figures 3, 7, 8, 9:
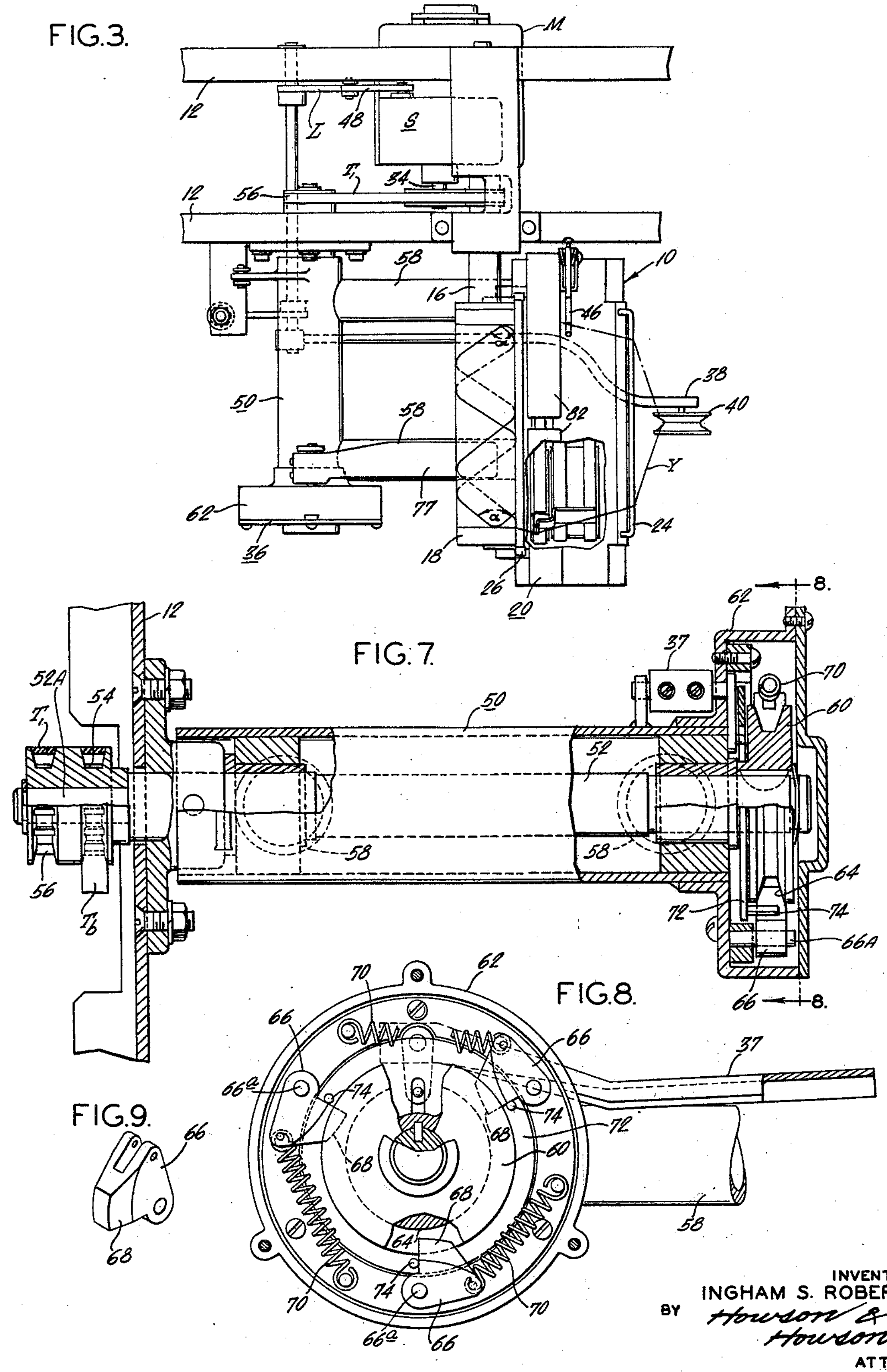
FIG. 3 is a top view of the yarn winder shown in FIGS. 1 and 2.
FIG. 7 is an enlarged view partly in section of the traverse assembly supporting structure and of a clutch assembly for controlling movement of the traverse assembly away from and toward the package.
FIG. 8 is an enlarged sectional view taken on line 8—8 of FIG. 7.
FIG. 9 is a perspective view of one of the sprags of the clutch assembly of FIG. 8.

Referring now to the drawings and particularly to FIGS. 1–3 thereof, there is illustrated yarn winding apparatus constructed in accordance with the present invention generally designated by the numeral 10. The apparatus 10 includes a supporting frame 12, a spindle 16 for mounting a tube or cone center 18 on which the package is formed and a traverse assembly generally designated by the numeral 20 for guiding the yarn Y as it is laid onto the tube 18 to form the package P.

The traverse assembly includes a housing 22, a pair of spaced apart guide bars 24 and 26 generally parallel to the package surface in a plane defined as the "traverse plane" A, a roller bail 28 and countermoving guide members $F_1$ and $F_2$ for moving the yarn back and forth in the traverse plane during formation of the package.

The spindle 16 is rotated to form the package P by a drive system including a motor M and a speed control device S generally of the type shown in my prior Patent No. 3,228,617. As illustrated, the output shaft 30 of motor M is connected through suitable transmission, in the present instance, a belt T to the input shaft 32 of the speed control device S, the output shaft 34 of the speed control device S being connected through a timing belt transmission $T_1$ to the spindle 16 and to traverse drive sprocket 56.

The yarn winding apparatus further includes a support structure mounted on the framework which supports the traverse assembly in a manner permitting it to be rotated by the pressure of the roller bail 28 against the package in a clockwise direction as indicated by the arrow in FIG. 1. This support structure includes a shaft member 52 which is securely mounted on frame 12 and perpendicular thereto and which supports tubular member 50 for rotation thereabout. Other tubular members 58 interconnect member 50 and the housing 22 of the traverse assembly. The traverse assembly is normally biased in a counterclockwise direction by means of an adjustable spring 29 connected to an appended portion 50*a* of the member 50 and to the frame 12. A counterweight hanging from the portion 50*a* may be substituted for the spring 29. As overrunning clutch arrangement 36 interconnects shaft 52 and tubular member 50 and permits free clockwise rotation of member 50 relative to shaft 52, but restricts counterclockwise rotation. This restriction may be released by depressing handle 37 as shown or by lifting upward on traverse assembly housing 22 to overcome a friction clutch (not shown).

In the present instance, the yarn winder also includes a pivotally mounted dancer roll arm 38 mounting a pulley 40 over which the yarn Y passes, the dancer roll arm 38 being connected by a suitable linkage L to the speed control mechanism S. The linkage L includes an adjustable spring 42 which controls the tension in the yarn and which is preferably set so that this tension decreases somewhat as the package increases in size.

Considering now briefly the general operation of the yarn winder, a tube 18 is placed on the spindle 16 and then the clutch handle 37 is depressed to release the traverse assembly 20 and permit it to be rotated from a lowered position upward or in a counterclockwise direction to a position where the roller bail 28 is spaced approximately an inch from the collecting surface of the tube center. The dancer roll arm 38 is then raised from the dotted line position (see FIG. 1) thereby releasing the starting switch 44 for the motor M to effect rotation of the spindle 16. The yarn Y is then looped under the dancer roll pulley 40 up over a guide bracket 46 and under and around the tube or cone center forming a "tail" thereon. The guide bracket 46 is then rotated forwardly to the broken line position shown in FIG. 2 to drop the yarn to the traverse plane A where it is reciprocated back and forth by the guide members $F_1$ and $F_2$ to form the package on the tube center. Clutch handle 37 is again depressed and the traverse assembly 20 is rotated upwardly to its starting position wherein the roller bail 28 engages the yarn forming into a package on the spindle. As the package of yarn builds up, the traverse assembly 20 rotates downwardly in a clockwise direction as indicated by the arrow in FIG. 1 and the dancer roll arm 38 floats against the bias of spring 42 to maintain the desired yarn tension as determined by the adjustment of the spring 42. Spring 29 has been adjusted to more than counter the weight of traverse assembly and its excess force is applied through the roller bail to the surface of the package continuously, but with progressively decreasing force, during package formation. When the package is finished, the yarn is cut, dropping the dancer roll arm 38 to engage the switch 44 to stop the machine.

If desired, the speed control link 48 of linkage L may be connected directly to one of the support members 58 for the traverse assembly in lieu of being connected to the dancer roll arm so that the output shaft 34 of the speed control mechanism S, traverse drive pulleys and spindle 16 slow down as the package builds up, thus maintaining approximately constant yarn takeup speeds.

Considering now more specifically some of the components of the yarn winding apparatus, the structural arrangement of the clutch assembly 36 is best shown in FIGS. 7, 8 and 9. As illustrated therein, the clutch comprises a housing 62 affixed to the outer extremity of cylindrical member 50 and a drum 60 affixed to the outer extremity of shaft 52. Drum 60 has a V groove 64 in its peripheral surface. In the present instance three sprags having tapered tips 68 as shown in FIG. 9 are pivotally mounted on pins 66*a* affixed to housing 62. The tapered tips 68 of sprags 66 engage in groove 64 of the drum and are so proportioned and positioned that the innermost extremity of each is radial with reference to its pin 66*a* and to the center of drum 60 when it is fully seated in the groove 64. Each sprag is urged toward this fully seated position by an individual spring 70. A single garter spring would be used if five or more sprags were employed. In operation, housing 62 is free to rotate clockwise relative to drum 60 since this motion loosens the wedge-shaped surfaces of the sprags in the groove, but counterclockwise rotation is prevented by a tendency of the sprags to seat more deeply and to wedge more securely. Depressing handle 37 rotates disc 72 and pins 74 counterclockwise releasing the wedging action of the sprags and permitting counterclockwise rotation of housing 62 relative to drum 60 and shaft 52. Timing belt sprockets 54 and 56 are arranged for integral rotation on an inboard extension 52*a* of shaft 52.

Figure 5:
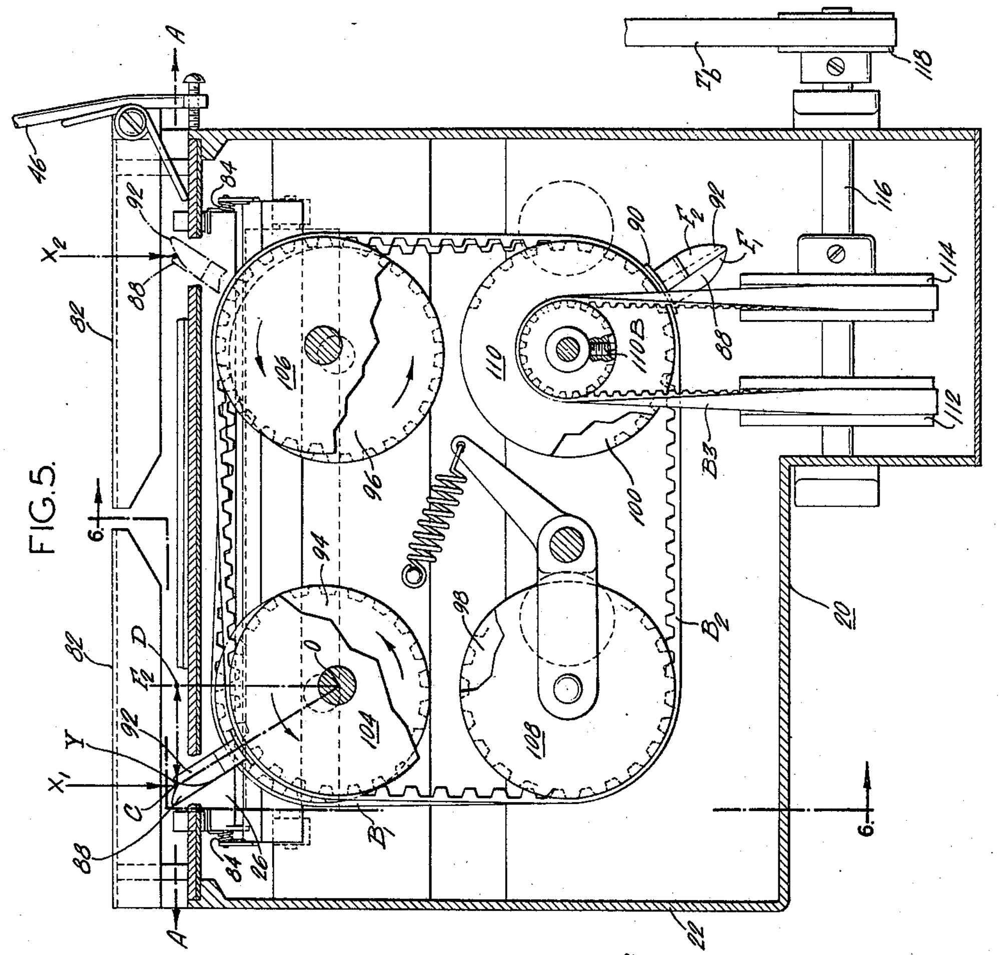
FIG. 5 is an enlarged sectional view showing the traverse assembly taken on lines 5—5 of FIG. 1.
Figure 6:
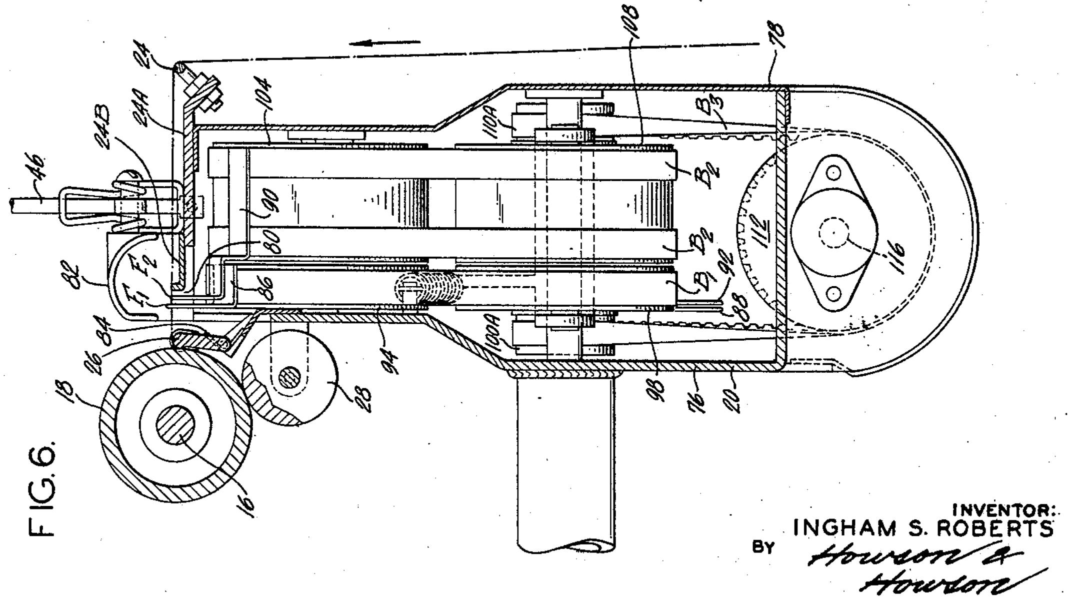
FIG. 6 is an enlarged sectional view of the traverse assembly taken on lines 6—6 of FIG. 5.

In the traverse assembly 20, which is best illustrated in FIGS. 5 and 6, the housing 22 has spaced apart inner and outer side walls 76 and 78, a top cover 24*a* and a lip 24*b* defining an elongated slot 80 in the top of the traverse assembly through which the guide members project. An arcuate two-piece cover 82 overlies this slotted opening 80, the elements of the cover 82 being spaced to permit insertion of the yarn by the guide bracket. In the traverse assembly 20, the inner guide bar 26 is disposed parallel to the axis of spindle 16 as shown if a cylindrical package is being wound or at an angle thereto if a conical package is being wound. Bar 26 may be movable as shown and biased to engage the surface of the package by means of a light spring 84 or it may be fixed or adjustable relative to housing 22 as explained later. Guide bar 24 cooperates with bar 26 to establish the traverse plane A of the yarn. A lip 24*b* on the traverse assembly cover 24*a* extends upward to the traverse plane and helps to stabilize the yarn at the ends of the traverse. In accordance with the present invention, the yarn is reciprocated back and forth in the traverse plan A by means of inner and outer guide members $F_1$ and $F_2$ which are mounted for movement in an endless path in opposite directions and which are adapted to cross at transfer points $X_1$ and $X_2$ adjacent opposite ends of the traverse assembly. As best illustrated in FIGS. 5 and 6, the guide members $F_1$ and $F_2$ are carried on endless timing belts $B_1$ and $B_2$ which are mounted on a plurality of sprockets for movement in an endless path. In the present instance, the inner timing belt $B_1$ mounts a pair of inner guide members $F_1$ at diametrically opposed points on the belt $B_1$ and the outer timing belt $B_2$ also mounts a pair of outer guide members $F_2$, likewise at diametrically opposed points on the belt $B_2$.

As best illustrated in FIGS. 5 and 6, each of the inner guide members $F_1$ is of L-shaped configuration comprising a base portion 86 secured to the belt and a finger or tip 88 projecting from the base. Each of the outer guide members $F_2$ comprises a base portion 90 of stepped configuration with a section overlying the inner belt $B_1$ so that the finger or tip 92 of the outer guide members $F_2$ move in a path closely adjacent the path of the inner guide fingers. The finger or tip of each of the guide members has a curved, forward-moving, yarn-engaging edge which is so shaped that its intersection with the traverse plane remains approximately perpendicular to the traverse plane as it passes downward through it. The outer timing belt $B_2$ is composed of two belt sections for stability of the guides.

In the present instance, each timing belt is mounted for movement in an endless path on four sprockets journalled between the side walls of the traverse guide assembly housing 22. Thus, the sprocket system for the inner timing belt $B_1$ includes a pair of spaced apart upper sprockets 94 and 96, an idler sprocket 98 below one of the upper sprockets 94 and a drive sprocket 100 below the other upper sprocket 96. The sprocket system for the outer timing belt $B_2$ comprises a pair of spaced apart upper sprockets 104 and 106, an idler sprocket 108 and a drive sprocket 110. In the present instance, all of the sprockets are identical in size and number of teeth and the drive sprockets for both belts are mounted on common centers. The idler sprockets 98 and 108 are mounted on separate centers. The idler sprockets 98 and 108 are mounted on separate bell cranks which are free to rotate on a common shaft and are spring biased. The timing belts $B_1$ and $B_2$ are counterrotated in precise timed relation to insure crossing of the fingers of inner and outer guide members $F_1$ and $F_2$ at the transfer points $X_1$ and $X_2$ by means including, in the present instance a sprocket 100*a* fixed to and having a common axis with sprocket 100, a sprocket 110*a* adjustably mounted on sprocket 110 and having a common axis therewith, a drive sprocket 114 which is fixed to shaft 116 which is driven by belt T*b* and sprocket 118, an idler sprocket 112 rotating on shaft 16 and timing belt $B_3$ which is driven by sprocket 114 and which drives sprockets 100*a* and 110*a* and idler sprocket 112. The rotary position of sprocket 110*a* relative to sprocket 110 is adjusted to provide the desired relative longitudinal positioning of belts $B_1$ and $B_2$. This adjustment is held by setscrew 110*b*.

However, in this embodiment of traverse assembly, the confronting pairs of upper sprockets for the belts $B_1$ and $B_2$ are mounted on staggered or offset centers so that the upper run of the belts $B_1$ and $B_2$ slope relative to one another and to a plane parallel to the traverse plane A. Thus, with respect to FIG. 5, the axis of rotation of the upper left hand sprocket 104 for the outer belt $B_2$ is disposed inboard and below the axis of rotation of the confronting upper left hand sprocket 94 for the inner belt $B_1$ and the axis of rotation of the upper right hand sprocket 106 of the outer belt $B_2$ is disposed outboard and above the axis of rotation of the confronting upper right hand sprocket 96 for the inner belt $B_1$. By this arrangement, the tip of the yarn engaging guide member extends radially outward relative to the tip of the yarn releasing guide member at their points of crossing and this facilitates the transfer of the yarn from one guide member to the other. It also makes it possible to adjust the guides relative to each other and to the traverse plane so that the yarn engaging guide member pushes the yarn from the yarn releasing guide member a moment before it would otherwise be released as the yarn releasing guide member passes downward through the traverse plane. This is sometimes advantageous with light yarns.

Considering again the operation of the yarn winder particularly as it pertains to the traverse assembly, as the yarn is being wound on to the spindle, the yarn is moved back and forth in the traverse plane A by guide members $F_1$ and $F_2$. More specifically, and with respect to FIG. 5, the outer guide fingers 92 carry the yarn across the package from right to left to the transfer point $X_1$ and the inner guide fingers 88 carry the yarn across the face of the package toward the transfer $X_2$. As noted previously, the timing belts $B_1$ and $B_2$ rotate in opposite directions in timed relation so that the fingers 88 and 92 cross over to transfer the yarn at the transfer points $X_1$ and $X_2$. Further, it is noted that the yarn transfer points $X_1$ and $X_2$ are disposed outboard of the axes of rotation of the upper sprockets of the traverse system. By this arrangement, the transverse movement of the yarn is greater than the movement of a corresponding point on the belt during the interval between the time when a guide finger starts to pass over a sprocket at the end of a traverse and the time it transfers the yarn to the opposed guide finger at the transfer point; that is, between the points C and D. This causes an acceleration of the transverse motion of the yarn at the ends of the traverse as between points C and D. As a result, sharper helix reversal angles $\alpha$ are formed by the yarn at the ends of the package which promotes better package end formation. The amount of this acceleration may be increased by increasing angle DOC or by increasing the ratio of distance $X_1O$ to the radius of sprocket 104. Further, at the transfer points, the guide fingers are riding on the sprockets at a point where each belt is stabilized by contact with the sprockets, and thus, only a very small clearance is required between the guide fingers which also facilitates formation of the sharp helix reversal angles $\alpha$ in the yarn. In the particular arrangement illustrated, at the transfer points the tip of a yarn-carrying finger is disposed below the tip of the opposed finger about to receive the yarn to thereby facilitate transfer of the yarn from one guide finger to another at the transfer points. Sprockets 16A, 56, 54, 118 and the internal sprockets of the traverse assembly constitute the gainer gear train and are chosen to provide the desired ratio between the package speed and the traverse speed. A driven line shaft connecting a plurality of winders in association with individual clutches may be substituted for motor M.

There is shown in FIGS. 10–13 modified forms of the traverse assembly. These modifications are shown schematically and the parts of the traverse guide which are identical to that described above, such as the housing, idler and drive sprockets and drive system for the timing belts are not shown.

Figures 10, 11, 12, 13, 14, 15:
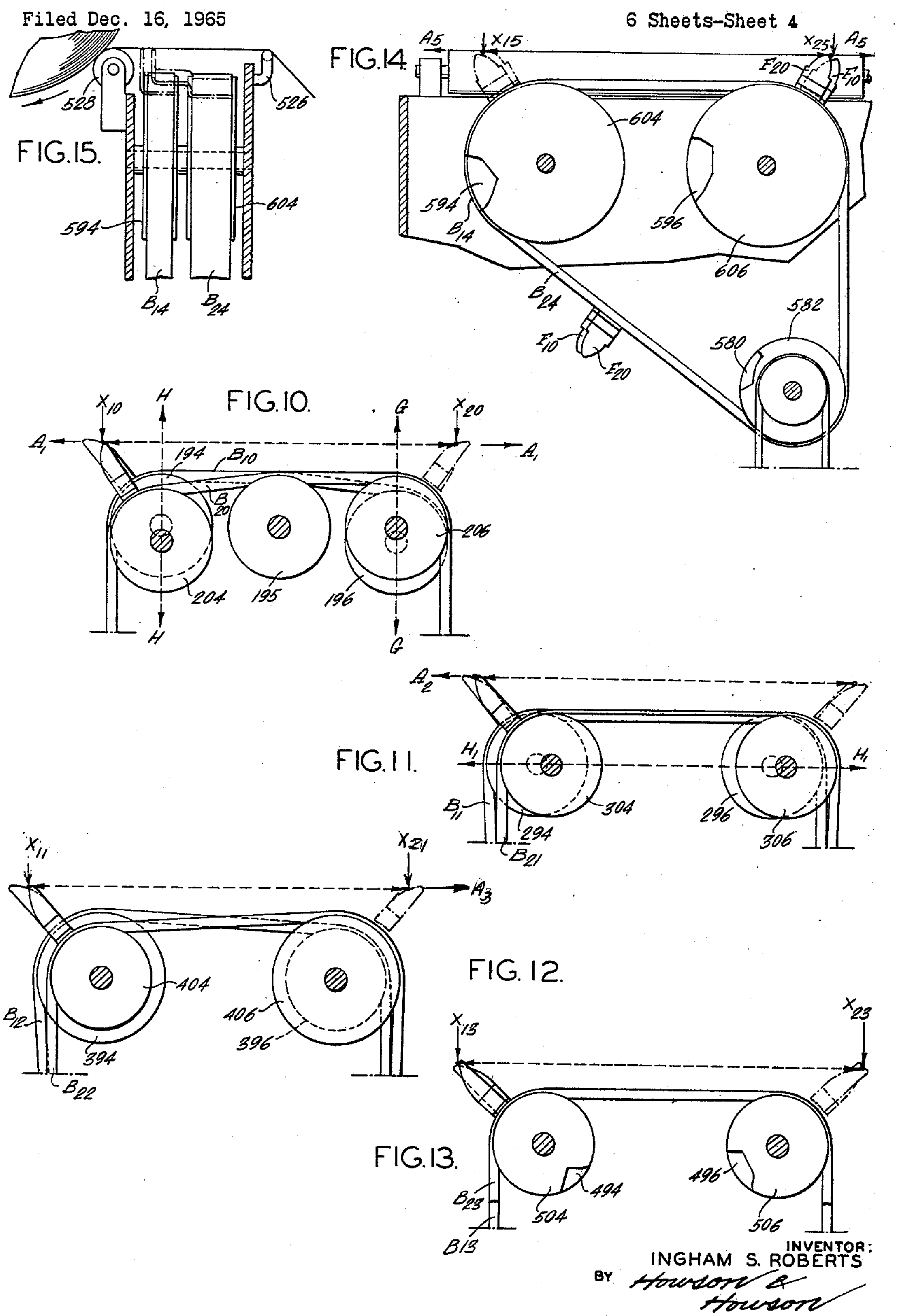
FIG. 10 is a schematic view of a first modification of the traverse assembly.
FIG. 11 is a schematic illustration of a second modification of the traverse assembly.
FIG. 12 is a schematic illustration of a third modification of the traverse assembly.
FIG. 13 is a schematic view of a fourth modification of the traverse assembly.
FIG. 14 is a fragmentary view of a fifth modification of the traverse assembly.
FIG. 15 is a view looking in from the front of the traverse assembly shown in FIG. 14.

In the embodiment shown in FIG. 10, a pair of confronting intermediate sprockets 195 mounted for rotation on a common center are provided between the spaced upper sprockets 194 and 196 for the inner timing belt $B_{10}$ and also between the upper sprockets 204 and 206 for the outer timing belt $B_{20}$. Additonally, in the present instance the axes of rotation of the confronting pairs of sprockets 194 and 204 are disposed in a common plane H normal to the traverse plane $A_1$, even though, as illustrated in the drawings, the axes of rotation of the sprockets 194 and 204 are offset in the plane H, the axis of rotation of the inner sprocket 194 being located closer to the traverse plane $A_1$ than the axis of rotation of the sprocket 204. The sprockets 196 and 206 similarly are oriented in a common plane G normal to the traverse plane $A_1$, except that in this instance the axis of rotation of the outer sprocket 206 is located closer to the traverse plane than the axis of rotation of the inner sprocket 196. This arrangement provides the desired acceleration of the yarn adjacent the transfer points $X_{10}$ and $X_{20}$ and the sloping arrangement of the belts also facilitates transfer of the yarn from the counter-moving guide fingers. In other words, a portion of the guide finger which is assuming contact with the yarn extends beyond the guide finger which is losing contact with the yarn at the point of transfer, thus, to promote a positive transfer at a precise point.

In the modification shown in FIG. 11, the confronting sprockets 294 and 304 for the belts $B_{11}$ and $B_{21}$ have axes of rotation in a common plane $H_1$ parallel to the traverse plane $A_2$, except that the axes of rotation are as spaced apart locations in that plane, the axis of rotation of the sprocket 294 being outboard of the sprocket 304. The other pair of confronting sprockets 296 and 306 also have axes of rotation in the plane $H_1$, except that the axes are spaced apart in that plane, the axis of the sprocket 306 being disposed outboard of the axis of rotation of the sprocket 296.

In the modification shown in FIG. 12, the confronting pairs of sprockets 394, 404 and 396, 406 for the belts $B_{12}$ and $B_{22}$ have a common axis of rotation. However, in the present instance the sprocket 404 for the outer belt is of a smaller diameter than the sprocket 394 and the reverse is true at the opposite end, that is, the diameter of the sprocket 406 is greater than the diameter of the sprocket 396. This arrangement also provides the sloping relationship of the upper run of the timing belts relative to the traverse plane $A_3$ and as the counter-moving guide fingers cross over at the transfer points $X_{11}$ and $X_{21}$, the tip of one projects above the tip of the other for smooth transfer of the yarn.

In the modification of FIG. 13, the confronting pairs of sprockets 494, 504 and 496, 506 for the inner and outer belts $B_{13}$ and $B_{23}$ have a common axis of rotation and are of the same diameter. In this embodiment, of course, the belts do not have a sloping arrangement, but the transfer points $X_{13}$ and $X_{23}$ are disposed outboard of the axes of rotation of the upper sprockets to provide for acceleration of the yarn as discussed above in connection with the first embodiment. This embodiment may be used with yarn having sufficient elasticity to enable it to spring back toward the center of the traverse when released by a guide finger.

There is shown in FIGS. 14 and 15, another embodiment of traverse assembly in accordance with the present invention. In this embodiment, the inner and outer timing belts $B_{14}$ and $B_{24}$ are mounted for movement in an endless path in opposite directions on a three-sprocket system. The sprocket system for the timing belt $B_{14}$ includes a pair of spaced apart upper sprockets 594 and 596 mounted for rotation about axes lying in a plane parallel to the traverse plane $A_5$ and a drive sprocket 580. The sprocket system for the timing belt $B_{24}$ comprises a pair of spaced apart upper sprockets 604 and 606 also having axes of rotation in the same common plane as the sprockets 594 and 596 and a drive sprocket 582. In the present instance, the inner and outer belts mount two equispaced guide fingers $F_{10}$ and $F_{20}$ respectively. These guide fingers as in the previously described arrangements, cross over at the transfer points $X_{15}$ and $X_{25}$ at a point outboard of the axis of rotation of the upper sprockets to impart the desired transverse acceleration to the yarn as discussed above. It is noted that in the present instance, the traverse assembly housing mounts an outer guide bar 526 and the roller bail 528 serves the function of the inner guide bar.

Another important feature in the formation of precisely wound packages of good quality is the arrangement of the roller bail. In its normal position indicated in the drawings, the roller bail maintains a straight package face and in combination with the proper yarn tension control promotes the formation of package having the desired density and proper end formation. It further serves to move the traverse mechanism away from the spindle as the package builds up as discussed above. When used to wind tubular packages on a tube form, the axis of the roller bail should be parallel to the axis of the spindle 16 and to the inner guide bar 26. For moderate yarn speeds, the roller bail should have a relatively small diameter and should be placed as closely as possible to the inner guide bar 26 to help control and set the lay of the yarn on the package.

In the yarn winder shown in FIGS. 1 and 2, the inner guide bar 26 maintains a light contact pressure with the package during formation thereof. This arrangement is suitable with certain yarns and at lower winding speeds where continuous contact between the guide bar and the yarn will not damage the yarn.

Figure 16:
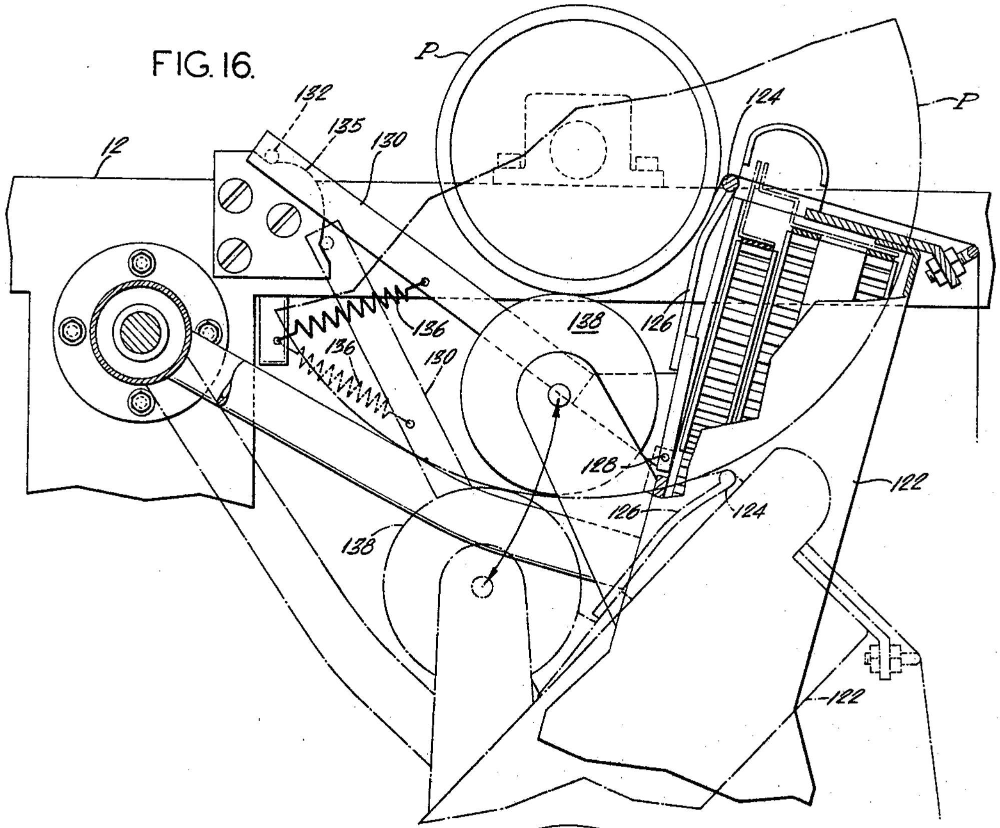
FIG. 16 is a fragmentary front elevational view of a cam arrangement for positioning the inner traverse guide bar.

At higher yarn winding speeds however, it is desirable to use a roller bail of larger diameter to reduce its rotary speed to within practical limits and in order to form precisely wound packages with the sharp helix reversal angles, it is desirable to maintain a relatively small clearance between the inner guide bar and the package surface for proper lay of the yarn on the package. There is shown in FIG. 16 an arrangement of roller bail and inner guide bar for achieving this end. As shown therein, the inner guide bar 124 is carried by a support member 126 which is pivotally mounted as at 128 to the traverse assembly housing 122. An elongated bar or beam 130 is attached to the support 126 at approximately right angles thereto and mounts at its outer end a pin 132 which rides on a plane 134 secured to the frame of the winder having a contoured cam face 135. Contact between the pin 132 and cam face 135 is maintained by a tension spring 136. The cam face 135 is so shaped and positioned that as the package builds up and the roller bail 138 moves downward, the inner guide bar 124 maintains a predetermined small clearance between the surface of the bar and the package.

In a preferred arrangement, the space between the bar and the package is progressively increased at a very small rate during the winding operation since this progressively decreases the package length and improves its end formation.

Figure 17:
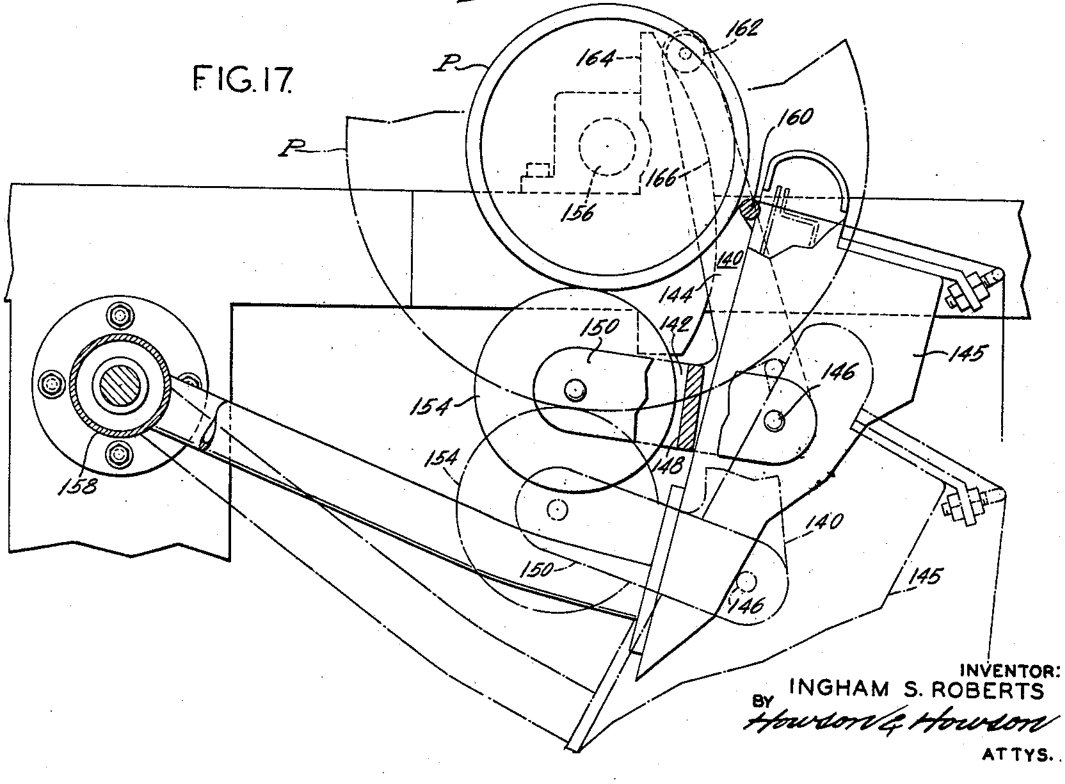
FIG. 17 is a fragmentary front elevational view of a cam arrangement for positioning the roller bail.

There is shown in FIG. 17 a modified arrangement for achieving the same results discussed above. As illustrated therein, a bell crank 140 having a pair of arms 142 and 144 is pivotally mounted to the traverse guide assembly housing 145 as at 146. A stiff structural member 148 connects one arm 142 of the bell crank with a leg member 150 which is pivoted at 146 from the rear end of the traverse housing 145. Arm 142 and leg 150 support the roller bail 154 in parallel relationship to the spindle 156, pivot point 158 of traverse assembly and guide bar 160. Arm 144 carries a cam follower 162 which engages a cam plate 164 supported on the framework and having a contoured cam face 166. By this arrangement, as the package builds up, the roller bail and traverse assembly rotate downward about spindle 158 and the movement of cam follower 162 on the cam face 166 permits the roller bail 154 to rotate downward relative to the traverse housing. It is noted that during this downward displacement of the roller bail, the surface of the package is maintained in close proximity to and in a controlled relationship with the guide bar 160 which is fixed relative to the traverse assembly housing 145.

Figure 18:
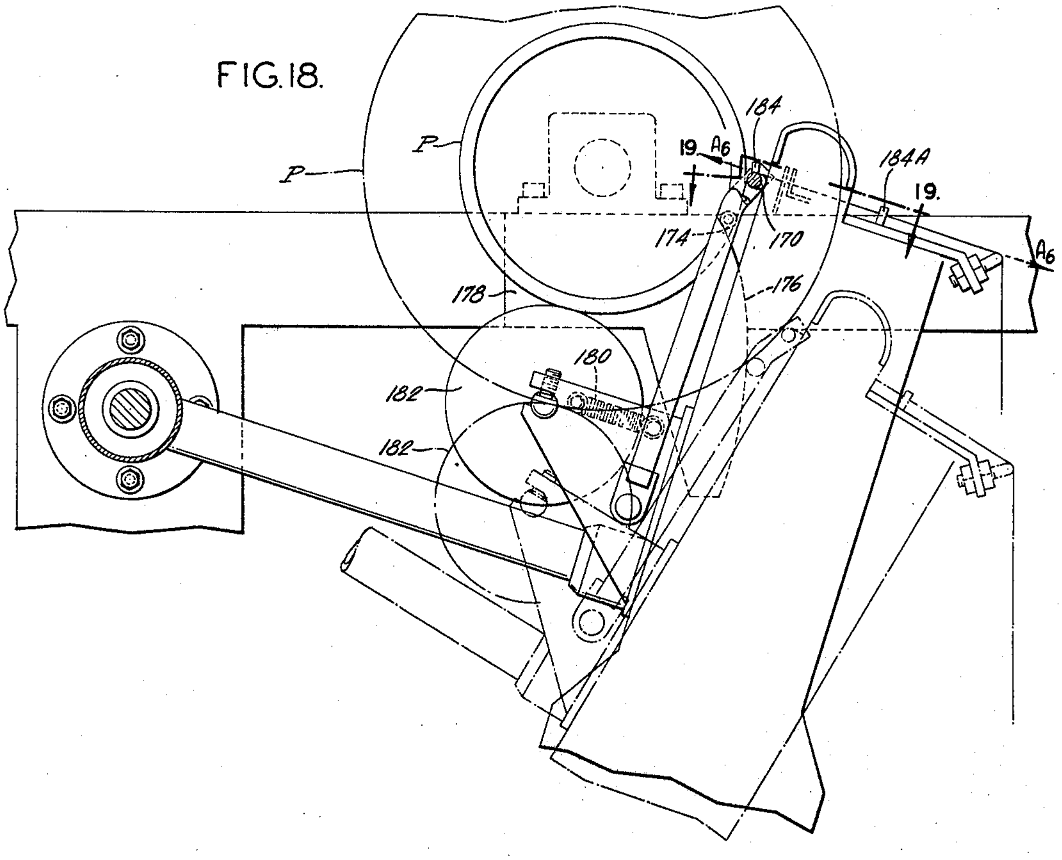
FIG. 18 is a fragmentary front elevational view of a further cam arrangement for positioning the inner traverse guide bar.
Figure 19:
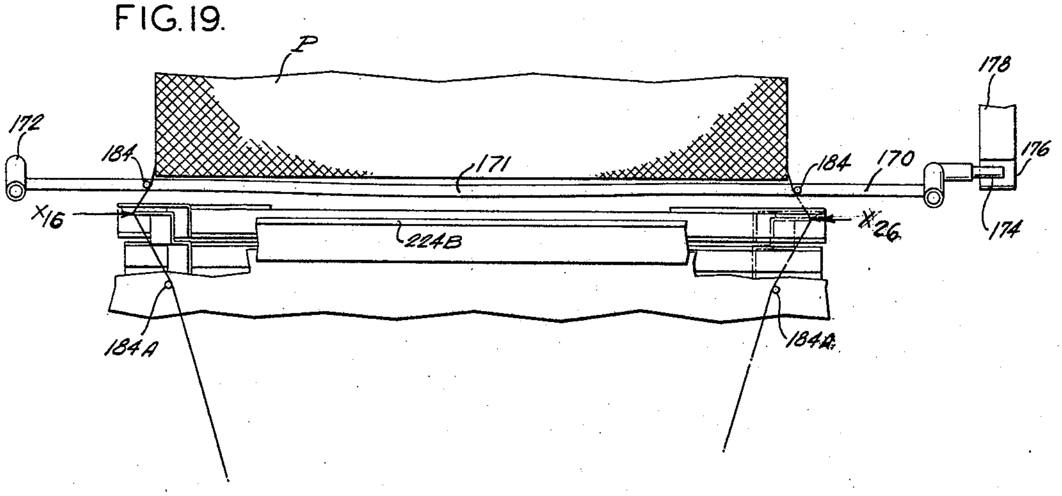
FIG. 19 is an enlarged view taken on line 19—19 of FIG. 18.

There is shown in FIGS. 18 and 19 a further modification of the front guide bar assembly. As illustrated therein, the guide bar 170 is carried by a support frame 172 which mounts a pin 174 which engages a contoured cam face 176 of a cam plate 178 secured to the frame of the winder. The guide bar assembly is normally urged in a direction toward the package by means of a spring 180 which maintains the pin 174 in contact with the cam face 176. Thus, as the package builds up, the roller bail 182 and traverse assembly move downward, pin 174 following the cam surface 176 to maintain an optimum small clearance between the bar 170 and the surface of the package. Optimum clearance between the bar and the package is about 0.030 inch for fine denier yarns. In the present instance, however, the bar 170 has an outwardly bowed central portion 171 to provide a very small clearance at the ends of the package where it is most important and a larger clearance at the center of the traverse.

The front guide bar 170 also mounts a pair of spaced apart detents or pins 184 which projects above the traverse plane $A_6$. The detents 184 are positioned adjacent the ends of the traverse or adjacent the transfer points $X_{16}$ and $X_{26}$ and have a predetermined relation to the crossover point of the guide fingers so that the yarn contacts the detent at approximately the same time as the yarn drops off of one guide finger and is contacted by the other at the crossover point. In a preferred arrangement, the guides and detents are so positioned that at the end of a traverse the yarn first contacts a detent, then, an instant later, it contacts the pick-up guide which pushes it off the carrying guide an instant before it would otherwise be dropped by the carrying guide as its tip moves downward through the traverse plane. The detents 184 thus determine the precise point of helix reversal and since the distance between them for a given package is fixed, there is substantially no short term variation in traverse length. Thus, this detent arrangement on the guide bar also is an important factor in relation to the formation of the packages of superior characteristics. For a given yarn and wind ratio, end formation is a function of yarn tension, yarn tension drop-off, roller bail pressure, roller bail pressure drop-off, sharpness of helix reversal angle and precise longitudinal location of successive helix reversals. Without the detents 184, this last factor may become a problem at high speed due to minute differences in the configuration of the guide fingers and in the behavior of the several guide fingers.

FIGS. 18 and 19 also show the location of two pins 184_a_ which may be used with elastic yarns to deflect the yarn somewhat at the ends of the traverse so that it springs back farther when released by a guide and which thus further promotes a sharper helix reversal angle and better package end formation.

It is noted that the term "yarn" as used throughout the specification and claims is intended to include filaments of any material, threads, strands, as well as plied and cable structures. Further, even though various embodiments of the present invention have been illustrated and described herein it is not intended to limit the invention and changes and modifications may be made within the scope of the following claims. For example, the winder has been described in connection with packages on tubular centers. With slight modifications, the winder can be adapted for cone centers.

I claim:

1. In a yarn winding apparatus having takeup means for forming yarn into a package, a traverse assembly for guiding the yarn as it is being wound including means for supporting the yarn for longitudinal and reciprocal movement in a traverse plane, means for reciprocating the yarn in this plane comprising a pair of timing belts, a sprocket system for supporting said timing belts and moving them in endless paths in opposite directions, portions of said paths being generally parallel to the surface of the package, at least two first guides mounted on one of said timing belts, at least two second guides mounted on the other of said timing belts, the spacing between said first guides being the same and the same as the spacing between said second guides, said sprocket system including a pair of rotatably mounted upper sprockets for each of said belts, said first guides mounted on one of said belts extending outward and through the traverse plane during a yarn traverse in close proximity to the surface of the package and to the path of movement of said second guide, each of said guides being arranged to pass through the traverse plane in an arcuate path and in an outward direction to engage the yarn at one transfer point adjacent one end of the traverse and to pass through the traverse plane in an arcuate path and in an inward direction to release the yarn at another transfer point adjacent the opposite end of the traverse, said first and second guides being positioned relative to one another whereby the yarn is engaged by a first guide as it is released by a second guide at said one transfer point and the yarn is engaged by a second guide as it is released by a first guide at said other transfer point.

2. A traverse assembly as claimed in claim 1 wherein the guides move in a circular path adjacent the ends of the traverse at the transfer points whereby the guides accelerate the transverse motion of the yarn in the traverse plane at the ends of the traverse thereby to promote formation of sharp helix reversal angles and better package end formation.

3. A traverse assembly as claimed in claim 1 wherein each of the guides has a yarn-contacting edge of a predetermined shape so that its intersection with the traverse plane remains approximately perpendicular to the traverse plane as it passes inward to release the yarn adjacent the ends of the traverse.

4. A traverse assembly as claimed in claim 1, wherein the confronting pair of upper sprockets at each end of the traverse has a common axis of rotation and are of the same diameter.

5. A traverse assembly as claimed in claim 1, wherein the said guides are so shaped and positioned on the respective timing belts that the yarn-contacting edge of each is approximately perpendicular to the traverse plane as a guide passes between said upper sprockets and remains approximately perpendicular to said traverse plane as it moves inward to release the yarn at the end of the traverse.

6. A traverse assembly as claimed in claim 1 including at least one pair of idler sprockets for the timing belts mounted on a common center and disposed between the pairs of upper sprockets of the sprocket system.

7. A traverse assembly as claimed in claim 1, wherein the upper sprockets for the belts are generally confronting and the axes of rotation of the confronting pair of upper sprockets at each end of the traverse are offset relative to one another in a plane parallel to the traverse plane.

8. In a yarn winding apparatus as claimed in claim 1 including a roller bail for forming the yarn as it is being wound on the package and an inner guide bar and wherein the position of the inner guide bar is fixed relative to the traverse assembly and wherein the traverse assembly is pivotally mounted and is positioned by said roller bail as it contacts the package to maintain a predetermined small clearance between the guide bar and the package.

9. In a yarn winding apparatus as claimed in claim 1 wherein the guides have yarn-contacting portions and wherein the guides which are mounted on the belt which is farthest from the package extend over at least a portion of the belt which is closest to the package throughout its full length whereby the paths of the yarn-contacting portion of the guides are in close proximity to each other and to the surface of the package.

10. In a yarn winding apparatus as claimed in claim 1 wherein the guides move in a straight line path at a uniform speed during the major portion of the traverse whereby there is no transverse acceleration of the yarn and the guides move in an arcuate path adjacent the ends of the traverse approaching the transfer points whereby the guides accelerate the transverse motion of the yarn in the traverse plane.

11. A traverse assembly as claimed in claim 1 wherein the yarn engaging portion of each guide moves at constant speed between said upper sprockets and with a controlled degree of acceleration at both ends of the traverse.

12. In a yarn winding apparatus as claimed in claim 11 wherein the degree of guide acceleration at the ends of the traverse is controlled in part by the angle through which the upper sprockets supporting the yarn release guides are arranged to turn between the point at which each guide enters a circular path near the end of the traverse and the transfer point.

13. A traverse assembly as claimed in claim 1 wherein the axes of each pair of upper sprockets are spaced apart by a distance less than the distance between the guides mounted on said belts.

14. In a yarn winding apparatus as claimed in claim 1 wherein any one of said guides is a yarn-engaging guide when moving outward through the traverse plane to engage the yarn and wherein any one of said guides is a yarn-releasing guide when moving inward through the traverse plane to release the yarn and wherein a yarn-engaging guide extends outward relative to a yarn-releasing guide at each of said transfer points.

15. A traverse assembly as claimed in claim 14 wherein the guides may be alternatively positioned so that the yarn-engaging guide pushes the yarn from the yarn-releasing guide an instant before it would otherwise be released as the yarn-releasing guide passes inward through the traverse plane.

16. A traverse assembly as claimed in claim 14, wherein the axes of rotation of the confronting pair of upper sprockets at each end of the traverse are offset relative to one another in such manner that the tip of the yarn-engaging guide extends radially outward relative to the tip of the yarn-releasing guide at their points of crossing.

17. A traverse assembly as claimed in claim 14, wherein the pair of upper sprockets at each end of the traverse has a common axis of rotation, the inner sprocket at one end of the traverse having a greater diameter than the outer sprocket and the outer sprocket at the other end of the traverse has a greater diameter than the inner sprocket and these relative sprocket diameters are chosen so that the tip of the yarn-engaging guide extends outward relative to the tip of the yarn-releasing guide at their points of crossing.

18. A traverse assembly as claimed in claim 14 wherein the sprocket system for moving the two timing belts in opposite directions includes, in addition to the four traverse belt carrying sprockets of said pair of spaced apart upper sprockets for each belt, a fifth sprocket engaging one of said belts for driving said belt, a sixth sprocket mounted coaxially with said fifth sprocket and engaging the other of said belts for driving said belt, a seventh sprocket mounted coaxially with and for movement with said fifth sprocket, an eighth sprocket having the same number of teeth as said seventh sprocket and mounted coaxially with and for movement with said sixth sprocket, a ninth sprocket mounted in a plane tangent to the peripheries of said seventh and eighth sprockets and on and for rotation with a drive shaft lying in a plane normal to the axes of the traverse belt carrying sprockets, a tenth sprocket mounted for free rotation in a plane tangent to the peripheries of said seventh and eighth sprockets at points of tangency generally opposite to the points of tangency of the plane of said ninth sprocket and an endless timing belt engaging and interconnecting said seventh, eighth, ninth and tenth sprockets to counter-rotate the two systems of traverse belt carrying sprockets and the traverse belts and guides which are mounted thereon.

19. A traverse assembly as claimed in claim 18 wherein said seventh sprocket is mounted for adjustable rotation relative to said fifth sprocket before being fixed therto for movement therewith to provide means for precise adjustment of the longitudinal position of the guides on one of said traversing belts relative to the longitudinal position of the guides on the other traversing belt and particularly to permit adjusting the relative position of the guides at the transfer points so that the yarn is pushed from the yarn-releasing guide by the yarn-engaging guide an instant before it would otherwise be released as the yarn-releasing guide moves inward through the traverse plane.

20. A traverse assembly as claimed in claim 18 wherein the number of teeth on said seventh, eighth and ninth sprockets are chosen to provide, in combination with other traverse assembly and package spindle drive sprockets, a desired gainer gear ratio between the package spindle speed and the frequency of yarn transfers and thus to provide a desired precise package wind.

21. In a yarn winding apparatus as claimed in claim 14 wherein the upper sprockets for said one belt generally confront the upper sprockets for said other belt, and wherein said confronting sprockets are of the same diameter, the axes of said confronting sprockets being offset by a distance less than the radius of the sprockets and in a predetermined direction whereby a yarn-engaging guide extends outward relative to a yarn-releasing guide at each of said transfer points.

22. In a yarn winding apparatus as claimed in claim 14 wherein the upper sprockets for said one belt generally confront the upper sprockets for said other belt and wherein the axes of the confronting sprockets are offset whereby a yarn-engaging guide extends outward relative to a yarn-releasing guide at each of said transfer points.

23. In a yarn winding apparatus as claimed in claim 1 wherein the means supporting the yarn for movement in a transverse plane includes an inner guide bar interposed between the path of movement of the guides and the surface of the package in a close proximity to both and parallel to the surface of the package to establish an optimum elevation of the traverse plane relative to the guides and to deflect the yarn as it passes from the traverse plane to the package to minimize the length of uncontrolled yarn between a guide and the surface of the package at the transfer points and thus to minimize dwell and provide sharper helix reversal angles in the yarn and better package end formation.

24. A traverse assembly as claimed in claim 23 including means for maintaining a controlled small clearance between the inner guide bar and the surface of the package during package formation.

25. A traverse assembly as claimed in claim 23 including means for maintaining a light contact pressure between the inner guide bar and the surface of the package during package formation.

26. A traverse assembly as claimed in claim 23 wherein the first guides are mounted on one of said timing belts nearest the surface of the package in a manner to bring the path of the yarn-contacting edge into close proximity with said inner guide bar and the second guides on the other timing belt are so shaped and mounted that a portion of each of said second guides passes over the inner sprockets to bring the path of the yarn-contacting edge of the said second guides into close proximity with the yarn-contacting edge of said first guides.

27. A traverse assembly as claimed in claim 23 including means for maintaining the inner guide bar in a predetermined position relative to the surface of the package during build up of the package.

28. A traverse assembly as claimed in claim 1, wherein said one belt is closest to the surface of the package and wherein said second guides mounted on said other belt extend outward and across a portion of said one belt and then outward through the traverse plane thereby to locate the paths of the oppositely moving guides in close proximity to each other.

29. A yarn winding apparatus comprising a frame structure, a spindle rotatably mounted on said frame structure to support a member on which the yarn is wound, a drive system for rotating the spindle, a traverse assembly pivotally mounted on said frame structure for movement toward and away from said spindle, a roller bail for forming the yarn as it is being wound on the package, biasing means causing the roller bail to exert pressure on the package throughout its formation, means supporting the yarn for back and forth movement in a traverse plane, at least one pair of first guides, means mounting said first guides for movement in a predetermined path to effect actuation of said yarn in one direction in said traverse plane, at least one pair of second guides, means mounting said second guides for movement in a predetermined path to effect actuation of said yarn in a direction opposite said one direction in said traverse plane, the path of said first and second guides being in close juxtaposition and close to the surface of the package, said first and second guides crossing at transfer points at opposite ends of the traverse, means supporting said guides so that they move in a straight line path during the major portion of the traverse whereby there is no transverse acceleration of the yarn and means guiding the guides for movement in an arcuate path adjacent the ends of the traverse approaching the transfer points whereby the guides accelerate the transverse motion of the yarn in the traverse plane at the ends of the traverse thereby to promote formation of sharp helix reversal angles and better package and formation.

30. A yarn winding apparatus as claimed in claim 29 wherein said means supporting the yarn for movement in a traverse plane includes an inner guide bar disposed between the path of the guides and the surface of the package and in close proximity to and parallel to each.

31. A yarn winding apparatus as claimed in claim 30 including means for maintaining a predetermined relationship between the inner guide bar and the package surface during package formation.

32. A yarn winding apparatus as claimed in claim 31 wherein said means for maintaining a predetermined relationship between the inner guide bar and package includes a support member on which the traverse guide bar is mounted, means pivotally mounting the support member to the traverse assembly, a cam mounted on said frame and a cam follower carried by said support member engaging said cam, said cam having a predetermined configuration so that as the package builds up a predetermined clearance is maintained between the traverse guide bar and the surface of the package.

33. A yarn winding apparatus as claimed in claim 31 wherein said inner guide bar is fixed relative to the traverse assembly and wherein said means maintaining a predetermined relationship between the inner guide bar and package includes a support member on which the roller bail is mounted, means pivotally mounting the support member to the traverse assembly, a cam mounted on said frame and a cam follower carried by said support member engaging said cam, said cam having a predetermined configuration so that as the package builds up a predetermined clearance is maintained between the inner guide bar and the surface of the package.

34. A yarn winding apparatus as claimed in claim 30 wherein a pair of spaced apart detents are mounted on said inner guide bar at each end near the point of yarn reversal, said detents extending generally upward through the traverse plane.

35. A yarn winding apparatus comprising a frame structure, a spindle rotatively mounted on said frame structure to support a member on which the yarn is wound, a drive system for rotating the spindle, a traverse assembly pivotally mounted on said frame structure for movement toward and away from said spindle, a roller bail for forming the yarn as it is being wound on the package, biasing means causing the roller bail to exert pressure on the package throughout its formation, a means for reciprocating the yarn back and forth in a traverse plane as it is being wound, an inner guide bar disposed between the surface of the package and the means for reciprocating the yarn back and forth in the traverse plane, means for maintaining a predetermined relationship between the inner guide bar and the package surface during package formation, said inner guide bar being fixed relative to the traverse assembly, said means maintaining a predetermined relationship between the inner guide bar and package including a support member on which the roller bail is mounted, means pivotally mounting the support member to the traverse assembly, a cam mounted on said frame and a cam follower carried by said support member engaging said cam, said cam having a predetermined configuration so that as the package builds up a predetermined clearance is maintained between the inner guide bar and the surface of the package.

36. In a yarn winding apparatus as claimed in claim 35 wherein said drive system includes means for actuating the yarn reciprocating means in synchronized relation with said spindle.

37. In a yarn winding apparatus having takeup means for forming yarn into a package, a traverse assembly for guiding the yarn as it is being wound including means for supporting the yarn for longitudinal and reciprocal movement in a traverse plane comprising at least one pair of first guides, means mounting said first guides for movement in a predetermined path to effect actuation of said yarn in one direction in said traverse plane, at least one pair of second guides, means mounting said second guides for movement in a predetermined path to effect actuation of said yarn in a direction opposite said one direction in said traverse plane, the path of said first and second guides being in close juxtaposition and close to the surface of the package, said first and second guides crossing at transfer points at opposite ends of the traverse, means supporting said guides so that they move in a straight line path during the major portion of the traverse whereby there is no transverse acceleration of the yarn and means guiding the guides for movement in an arcuate path adjacent the ends of the traverse approaching the transfer points whereby the guides accelerate the transverse motion of the yarn in the traverse plane at the ends of the traverse thereby to promote formation of sharp helix reversal angles and better package and formation.

38. A yarn winding apparatus comprising a frame structure, a spindle rotatably mounted on said frame structure to support a member on which the yarn is wound, a drive system for rotating the spindle, a traverse assembly pivotally mounted on said frame structure for movement toward and away from said spindle, a roller bail for forming the yarn as it is being wound on the package, biasing means causing the roller bail to exert pressure on the package throughout its formation, means supporting the yarn in a traverse plane, said traverse assembly including a first pair of rotatably mounted upper sprockets, a timing belt mounted on said sprockets for movement thereby at a uniform speed in one direction, at least two first guides mounted on said belt for movement therewith in close proximity to and parallel to the surface of said member on which the yarn is wound, a second pair of rotatably mounted upper sprockets generally confronting said first pair of sprockets, a second timing belt mounted on said second sprockets for movement thereby at the same uniform speed in a direction opposite to said one direction, at least two second guides mounted on said second belt for movement therewith in close proximity to said first guides, whereby yarn moving longitudinally in said traverse plane is moved transversely in this plane by contact with one of said first or second guides, the contact point between the yarn and the guide moving in a straight line at said uniform speed of the belts while passing between the axes of said pairs or upper sprockets and then moving in the same straight line in the traverse plane as the guide follows an arcuate path toward and through the traverse plane wherein the radius of movement of said contact point is greater than the radius of movement of the belt whereby the transverse speed of the yarn is accelerated and wherein said contact point moves outward on the guide and contacts progressively faster moving portions of the guide whereby the transverse speed of the yarn at the ends of the traverse is further accelerated.

References Cited

UNITED STATES PATENTS

| | | | |
|---|---|---|---|
| 834,420 | 10/1906 | Taylor. | |
| 1,475,525 | 11/1923 | Tober | 242—43 |
| 2,238,128 | 4/1941 | Nydegger | 242—158 X |
| 2,662,695 | 12/1953 | Ballard | 242—43 |
| 3,294,327 | 12/1966 | Horwood | 242—43 |

FOREIGN PATENTS

| | | |
|---|---|---|
| 642,286 | 6/1962 | Canada. |
| 396,207 | 5/1924 | Germany. |
| 396,776 | 6/1924 | Germany. |

STANLEY N. GILREATH, Primary Examiner

U.S. Cl. X.R.

242—158

UNITED STATES PATENT OFFICE

CERTIFICATE OF CORRECTION

Patent No. 3,491,962 Dated January 27, 1970

Inventor(s) Ingham S. Roberts

It is certified that error appears in the above-identified patent and that said Letters Patent are hereby corrected as shown below:

Column 13, line 4; "transverse" should read --traverse--
Column 14, lines 11 & 17; "traverse" should read --inner--

SIGNED AND SEALED

SEP 29 1970

(SEAL)
Attest:

Edward M. Fletcher, Jr.
Attesting Officer

WILLIAM E. SCHUYLER, JR.
Commissioner of Patents